(12) United States Patent
Shibata et al.

(10) Patent No.: US 11,706,664 B2
(45) Date of Patent: Jul. 18, 2023

(54) ROUTE CONTROL METHOD AND ROUTE CONTROL DEVICE

(71) Applicant: NIPPON TELEGRAPH AND TELEPHONE CORPORATION, Tokyo (JP)

(72) Inventors: Naotaka Shibata, Musashino (JP); Hiroyuki Uzawa, Musashino (JP); Yoichi Fukada, Musashino (JP); Jun Terada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 217 days.

(21) Appl. No.: 17/298,336

(22) PCT Filed: Nov. 28, 2019

(86) PCT No.: PCT/JP2019/046628
§ 371 (c)(1),
(2) Date: May 28, 2021

(87) PCT Pub. No.: WO2020/116318
PCT Pub. Date: Jun. 11, 2020

(65) Prior Publication Data
US 2022/0116825 A1    Apr. 14, 2022

(30) Foreign Application Priority Data
Dec. 4, 2018  (JP) ................................ 2018-227574

(51) Int. Cl.
*H04W 28/08* (2023.01)
*H04W 40/02* (2009.01)
*H04W 72/566* (2023.01)

(52) U.S. Cl.
CPC ....... *H04W 28/0967* (2020.05); *H04W 40/02* (2013.01); *H04W 72/569* (2023.01)

(58) Field of Classification Search
None
See application file for complete search history.

(56) References Cited

U.S. PATENT DOCUMENTS

2008/0181114 A1* 7/2008 Foucand .............. H04J 3/0667
                                                       370/235
2016/0295563 A1* 10/2016 Bai ....................... H04W 72/52

OTHER PUBLICATIONS

Atsufumi Moriyama et al., A Proposal of Routing Algorithm Dealing with Multiple Metrics and a Study on the Precondition, Institute of Electronics, Information and Communication Engineers Next Generation Network Timed Research Expert Committee Work Shop 2010, Aug. 16, 2010.

* cited by examiner

*Primary Examiner* — Kouroush Mohebbi
(74) *Attorney, Agent, or Firm* — Harness, Dickey & Pierce, P.L.C.

(57) ABSTRACT

Provided is a path control method of controlling a path of communication in a network including a high priority device dealing with high priority traffic, a high priority control device communicating with the high priority device through a plurality of signal transfer devices transferring signals by periodically repeating a high priority signal transmissible period in which high priority traffic is transmissible and a low priority signal transmissible period in which low priority traffic is transmissible, a low priority device dealing with the low priority traffic, and a low priority control device communicating with the low priority device through the plurality of signal transfer devices, the path control method including calculating a low priority signal transmissible period in each of paths between the low priority device and (Continued)

the low priority control device, and performing setting for switching the path between the low priority device and the low priority control device so that the low priority traffic is transmitted in any one of the calculated low priority signal transmissible periods.

7 Claims, 14 Drawing Sheets

ROUTE CONTROL METHOD AND ROUTE CONTROL DEVICE

CROSS-REFERENCE TO RELATED APPLICATIONS

This application is a 371 U.S. National Phase of International Application No. PCT/JP2019/046628 filed on Nov. 28, 2019, which claims priority to Japanese Application No. 2018-227574 filed on Dec. 4, 2018. The entire disclosures of the above applications are incorporated herein by reference.

TECHNICAL FIELD

The present disclosure relates to a path control method and a path control device.

BACKGROUND ART

A cellular system can have a configuration in which a configuration of a base station is disposed to be separated into a wireless control device and a wireless device. In this case, the wireless control device and the wireless device are connected to each other through an optical section including an optical device and an optical fiber. The optical section including the optical device and the optical fiber is referred to as a mobile fronthaul (MFH).

In the related art, a point-to-point connection has been used in an MFH, but networking has also been examined in order to achieve a reduction in the cost of an MFH. Examples of networking include a configuration in which wavelength division multiplexed (WDM), a time division multiplexing-passive optical network (TDM-PON) using time division multiplexing, and a configuration in which layer-2 switches (L2SW) are connected in multiple stages. In particular, a network system in which layer-2 switches which are signal transfer devices are connected in multiple stages (hereinafter referred to as an "L2NW") has a ring or mesh type configuration, and thus the network system is considered to have higher reliability than other network systems.

On the other hand, a low delay is required in a mobile fronthaul. Consequently, standardization of a time sensitive network (TSN) has proceeded for the purpose of accommodating traffic having strict delay requirements. A time aware shaper (TAS), which is being examined for use in a TSN, is a particularly effective method in a case where high priority traffic has periodicity, and performs scheduling on traffic for each priority and switches communication availability.

Specifically, an operation of transferring only high priority traffic and not transferring low priority traffic in a period in which high priority traffic arrives at an SW and transferring low priority traffic in a period in which high priority traffic does not come is repeated periodically. Thereby, high priority traffic can be transferred without waiting for the transfer of traffic having other priorities, which is suitable for low delay.

FIG. 8 illustrates an example in which one high priority wireless device A and one high priority wireless control device S1 are accommodated in an L2NW. An L2-SW(1) to an L2-SW(7) are layer-2 switches that function as signal transfer devices. Hereinafter, the L2-SW(1) to the L2-SW(7) may be abbreviated as SW(1) to SW(7), SW1 to SW7, simply SW, or the like. In addition, the high priority wireless device A, the high priority wireless control device S1, and the like may be abbreviated simply as A, S1, or the like.

Here, which path traffic between the wireless device and the wireless control devices passes through can be set on a user side. As a path selection procedure of the related art, there is a technique for selecting a path having a minimum number of hops (for example, see Non Patent Literature 1).

FIG. 9 illustrates a path selection procedure of the related art. As illustrated in FIG. 9, in a path selection procedure of the related art, in step 1 (S1), a communication path that can be taken is retrieved for each pair of a wireless device and a wireless control device, and all of the communication paths that can be taken are listed.

In step 2 (S2), a communication path that does not satisfy preset setting conditions (requirements for a network) is excluded from among the listed communication paths, and a communication path satisfying the setting conditions is extracted. The setting conditions include one or more of items such as an allowable number of hops, an allowable delay time, an allowable transmission distance, and the like.

In step 3 (S3), a communication path having a minimum number of hops is selected for each pair of a wireless device and a wireless control device from among the extracted communication paths, and the processing is terminated. In this case, in a case where there are a plurality of communication paths having a minimum number of hops, any one of the communication paths is selected randomly, and the processing is terminated.

FIG. 10 illustrates an example of a case where a communication path is selected according to the related art illustrated in FIG. 9. Here, a communication path having a minimum number of hops is selected from among a plurality of communication paths.

FIG. 11 illustrates a flow of traffic in the example illustrated in FIG. 10. Further, in FIG. 11, it is assumed that a downlink and an uplink are repeated with time by time division duplex (TDD). A TAS is applied, and thus a period in which high priority traffic can be transmitted (high priority signal transmissible period: HP) and a period in which low priority traffic can be transmitted (low priority signal transmissible period LP) are repeated in each SW.

FIG. 12 illustrates an example in which one high priority wireless device A, one high priority wireless control device S1, one low priority wireless device B, and one low priority wireless control device S2 are accommodated in an L2NW. The high priority wireless device A belongs to the high priority wireless control device S1. The low priority wireless device B belongs to the low priority wireless control device S2.

FIG. 13 illustrates the selection of a communication path in which a path selection procedure of the related art is applied to the example illustrated in FIG. 12. A path between the high priority wireless device A and the high priority wireless control device S1 has a minimum number of hops. In addition, a path between the low priority wireless device B and the low priority wireless control device S2 also has a minimum number of hops.

FIG. 14 illustrates a flow of traffic in the example illustrated in FIG. 13. A low priority signal can be communicated only in a period in which a high priority signal is not transmitted, and thus a waiting time or the like occurs.

CITATION LIST

Non Patent Literature

Non Patent Literature 1: Atsufumi Moriyama and three others, "A Proposal of Routing Algorithm Dealing with Multiple Metrics and A Study on the Precondition," [online]

Aug. 16, 2010, IEICE, Temporary Technical Committee on Next Generation Networks, Workshop 2010; [accessed Nov. 13, 2018], Internet (URL: http://www.ieice.org/~nwgn/file_ws10/10_Moriyama.pdf)

SUMMARY OF THE INVENTION

Technical Problem

In a case where high priority traffic is traffic of a cellular system of TDD, uplink communication and downlink communication are alternately repeated, and thus a low priority signal transmissible period on a network is also alternately repeated in an uplink and a downlink. That is, a low priority signal transmissible period is necessarily present in either an uplink direction or a downlink direction.

On the other hand, timings of uplink communication and downlink communication of low priority traffic are not synchronized with timings of uplink communication and downlink communication of high priority traffic. In addition, the ratio of uplinks to downlinks is not aligned.

For this reason, in a method of the related art, a low priority signal transmissible period which is necessarily present in either an uplink direction or a downlink direction cannot be effectively utilized, and thus a waiting time is generated.

Here, the problem has been described with an example of TDD, but there is a problem that the utilization of a low priority signal transmissible period is low in a case where the position and width of a low priority signal transmissible period are different for each path and each direction of a path.

An object of the present disclosure is to provide a path control method and a path control device which are capable of reducing a waiting time of low priority traffic.

Means for Solving the Problem

A path control method according to an aspect of the present disclosure is a path control method of controlling a path of communication in a network including a high priority device dealing with high priority traffic, a high priority control device communicating with the high priority device through a plurality of signal transfer devices transferring signals by periodically repeating a high priority signal transmissible period in which high priority traffic is transmissible and a low priority signal transmissible period in which low priority traffic is transmissible, a low priority device dealing with the low priority traffic, and a low priority control device communicating with the low priority device through the plurality of signal transfer devices, the path control method including calculating a low priority signal transmissible period in each of paths between the low priority device and the low priority control device, and performing setting for switching the path between the low priority device and the low priority control device so that the low priority traffic is transmitted in any one of the calculated low priority signal transmissible periods.

In addition, a path control method according to another aspect of the present disclosure is a path control method of controlling a path of communication in a network including a high priority device dealing with high priority traffic, a high priority control device communicating with the high priority device through a plurality of signal transfer devices transferring signals by periodically repeating a high priority signal transmissible period in which high priority traffic is transmissible and a low priority signal transmissible period in which low priority traffic is transmissible, a low priority device dealing with the low priority traffic, and a low priority control device communicating with the low priority device through the plurality of signal transfer devices, the path control method including calculating a low priority signal transmissible period in each of paths between the high priority device and the high priority control device, and performing setting for switching the path between the high priority device and the high priority control device so that the low priority traffic is transmitted in any one of the calculated low priority signal transmissible periods.

Furthermore, in the path control method according to the aspect of the present disclosure, the performing setting includes matching a timing at which the path is switched to a timing at which the high priority device and the high priority control device change a transmission direction of a signal by TDD.

In addition, the path control method according to the aspect of the present disclosure further includes f obtaining a delay time of each of the paths calculated in the calculating and calculating a protection time corresponding to a difference in the delay time between the paths, in which performing setting includes performing setting for switching the path so that new low priority traffic does not flow until the protection time elapses.

In addition, a path control device according to still another aspect of the present disclosure is a path control device that controls a path of communication in a network including a high priority device dealing with high priority traffic, a high priority control device communicating with the high priority device through a plurality of signal transfer devices transferring signals by periodically repeating a high priority signal transmissible period in which high priority traffic is transmissible and a low priority signal transmissible period in which low priority traffic is transmissible, a low priority device dealing with the low priority traffic, and a low priority control device communicating with the low priority device through the plurality of signal transfer devices, the path control device including a communication path calculation unit configured to calculate a low priority signal transmissible period in each of paths between the low priority device and the low priority control device, and a communication path setting unit configured to perform setting for switching the path between the low priority device and the low priority control device so that the low priority traffic is transmitted in any one of the calculated low priority signal transmissible periods.

In addition, a path control device according to still another aspect of the present disclosure is a path control device that controls a path of communication in a network including a high priority device dealing with high priority traffic, a high priority control device communicating with the high priority device through a plurality of signal transfer devices transferring signals by periodically repeating a high priority signal transmissible period in which high priority traffic is transmissible and a low priority signal transmissible period in which low priority traffic is transmissible, a low priority device dealing with the low priority traffic, and the low priority control device communicating with the low priority device through the plurality of signal transfer devices, and a path control device including a communication path calculation unit configured to calculate a low priority signal transmissible period in each of paths between the high priority device and the high priority control device, and a communication path setting unit configured to perform setting for switching the path between the high priority device and the high priority control device so that the low priority traffic is transmitted in any one of the calculated low priority signal transmissible periods.

Further, in the path control device according to the aspect of the present disclosure, the communication path setting unit matches a timing at which the path is switched to a timing at which the high priority device and the high priority control device change a transmission direction of a signal by TDD.

In addition, the path control device according to the aspect of the present disclosure further includes a protection time calculation unit configured to obtain a delay time of each of the paths calculated in the communication path calculation unit and calculate a protection time corresponding to a difference in the delay time between the paths, in which the communication path setting unit performs setting for switching the path so that new low priority traffic does not flow until the protection time elapses.

Effects of the Invention

The present disclosure can reduce a waiting time of low priority traffic.

DESCRIPTION OF EMBODIMENTS

Hereinafter, an embodiment of a path control device will be described using the drawings.

Figure 1:
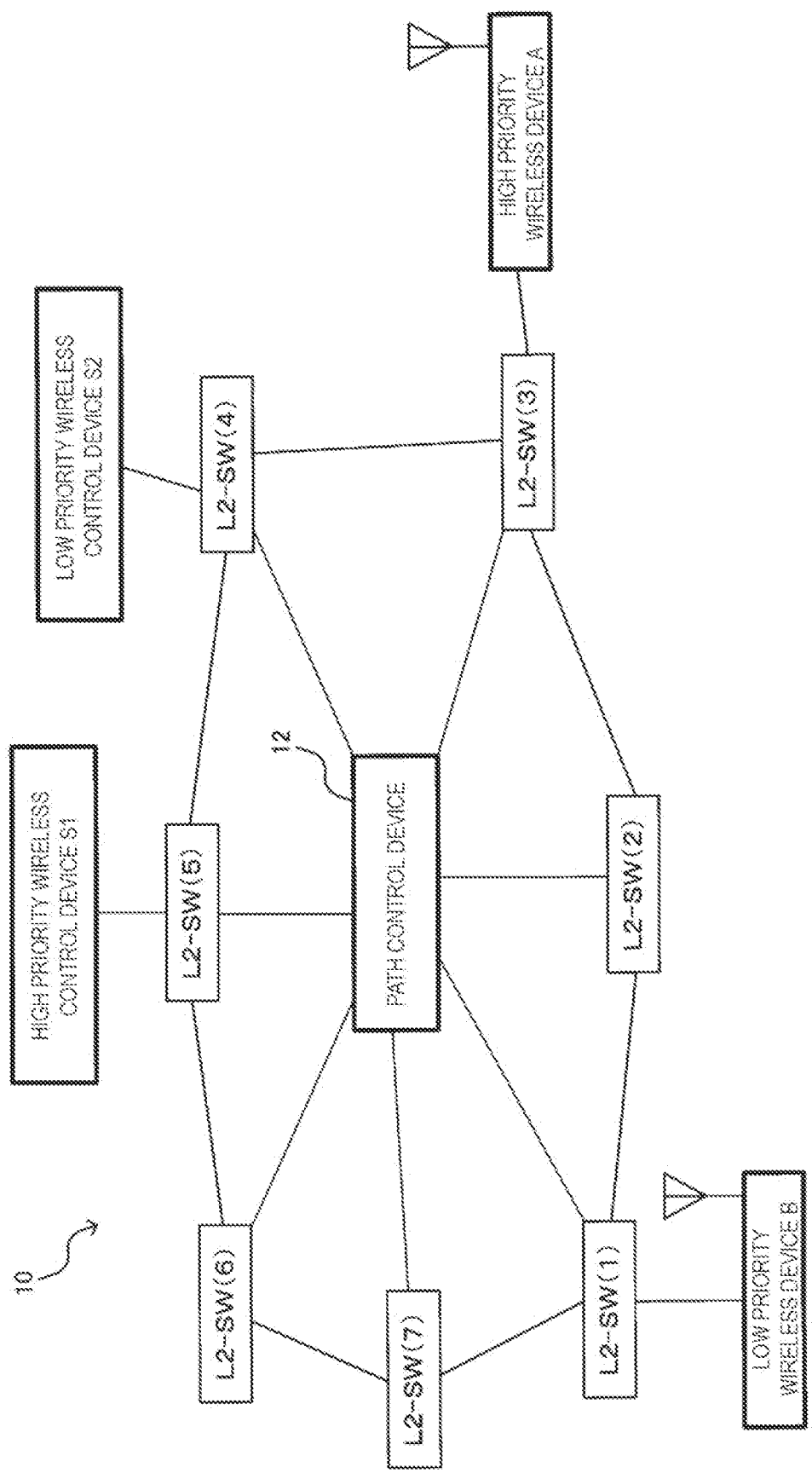
FIG. 1 is a diagram illustrating a configuration example of a wireless communication network including a path control device according to an embodiment.

FIG. 1 illustrates a configuration example of a wireless communication network 10 including a path control device according to an embodiment. As illustrated in FIG. 1, the wireless communication network 10 is, for example, a network system (L2NW) which includes one high priority wireless device A, one high priority wireless control device S1, one low priority wireless device B, one low priority wireless control device S2, and a path control device 12, which are connected to each other through the L2-SW(1) to the L2-SW(7) connected in multiple stages.

Each of the high priority wireless device A and the low priority wireless device B communicates with a terminal in a wireless manner. The high priority wireless device A belongs to the high priority wireless control device S1. The low priority wireless device B belongs to the low priority wireless control device S2. The L2-SW(1) to the L2-SW(7) are layer-2 switches that each function as a signal transfer device. For example, the L2-SW(1) to the L2-SW(7) periodically switch between a high priority signal transmissible period (HP) in which a high priority signal can be transmitted and a low priority signal transmissible period (LP) in which a low priority signal can be transmitted.

The path control device 12 controls a communication path in the wireless communication network 10. The path control device 12 may be disposed anywhere on the wireless communication network 10 as long as it can be connected to the L2-SW(1) to the L2-SW(7) in order to set a path for the L2-SW(1) to the L2-SW(7) each functioning as a signal transfer device.

Figure 2:
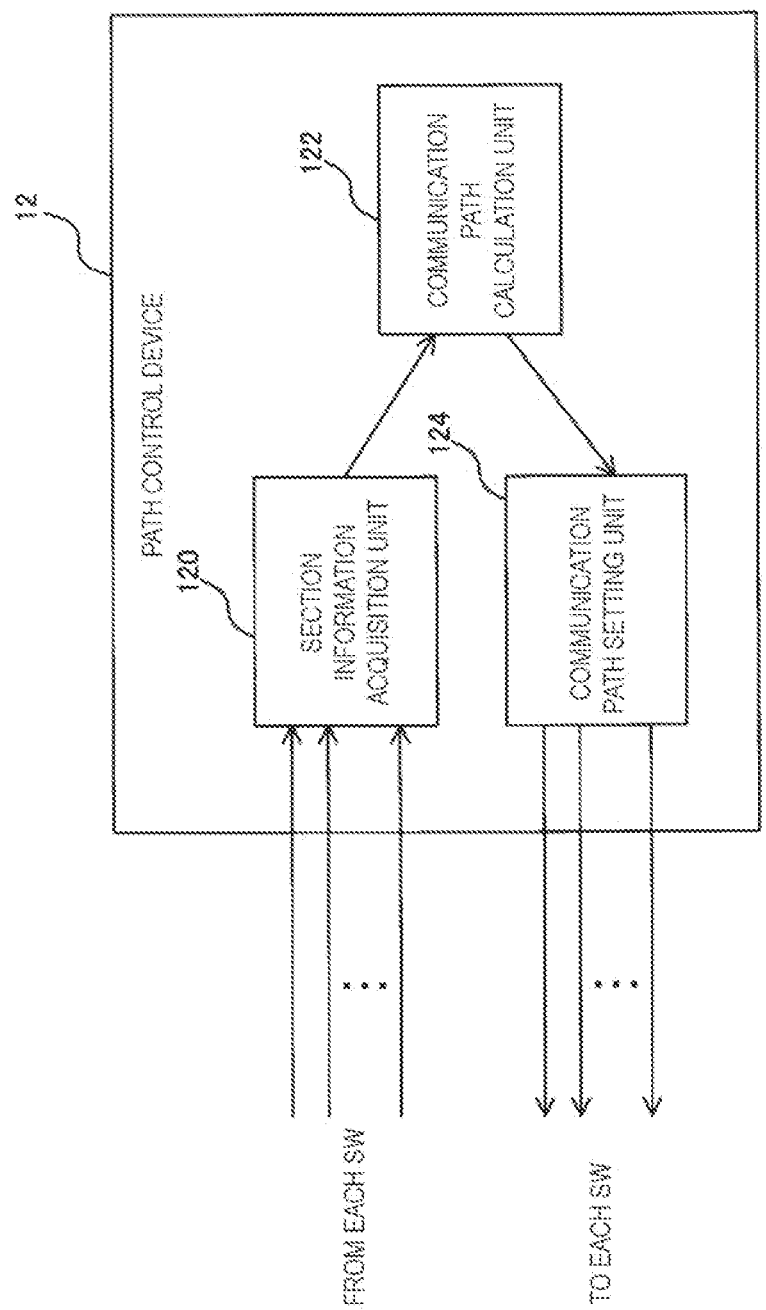
FIG. 2 is a diagram illustrating functions of a path control device.

FIG. 2 illustrates functions of the path control device 12. As illustrated in FIG. 2, the path control device 12 includes a section information acquisition unit 120, a communication path calculation unit 122, and a communication path setting unit 124.

The section information acquisition unit 120 acquires signal transmissible period information (communicable section information) including a high priority signal transmissible period (HP) and a low priority signal transmissible period (LP) in an SW from the respective SWs, and outputs the acquired signal transmissible period information to the communication path calculation unit 122.

The communication path calculation unit 122 calculates a path through which low priority traffic in each time slot can be transmitted, on the basis of the signal transmissible period information input from the section information acquisition unit 120, and outputs the calculated path to the communication path setting unit 124.

For example, the communication path calculation unit 122 calculates a low priority signal transmissible period (that is, a time slot in which low priority traffic can be transmitted) in each of paths between the low priority wireless device B and the low priority wireless control device S2.

Note that the communication path calculation unit 122 may calculate a low priority signal transmissible period in each of paths between the high priority wireless device A and the high priority wireless control device S1.

The communication path setting unit 124 performs setting on each of the SWs so that a path between the low priority wireless device and the low priority wireless control device is switched to a path including a low priority signal transmissible period calculated by the communication path calculation unit 122. Here, the communication path setting unit 124 matches a timing at which the path is switched to a timing at which the high priority wireless device A and the high priority wireless control device S1 change a transmission direction of a signal by TDD (a change timing between an uplink and a downlink).

For example, the communication path setting unit 124 sets a path between the low priority wireless device B and the low priority wireless control device S2 so that a period in which low priority traffic is transmitted is included within a low priority signal transmissible period of any one path between the low priority wireless device B and the low priority wireless control device S2 calculated by the communication path calculation unit 122.

Note that the communication path setting unit 124 may set a path between the high priority wireless device A and the high priority wireless control device S1 so that a period in which low priority traffic is transmitted is included within a low priority signal transmissible period of any one path between the high priority wireless device A and the high priority wireless control device S1 calculated by the communication path calculation unit 122.

Next, a specific example in which the path control device 12 switches a communication path will be described.

Figure 3:
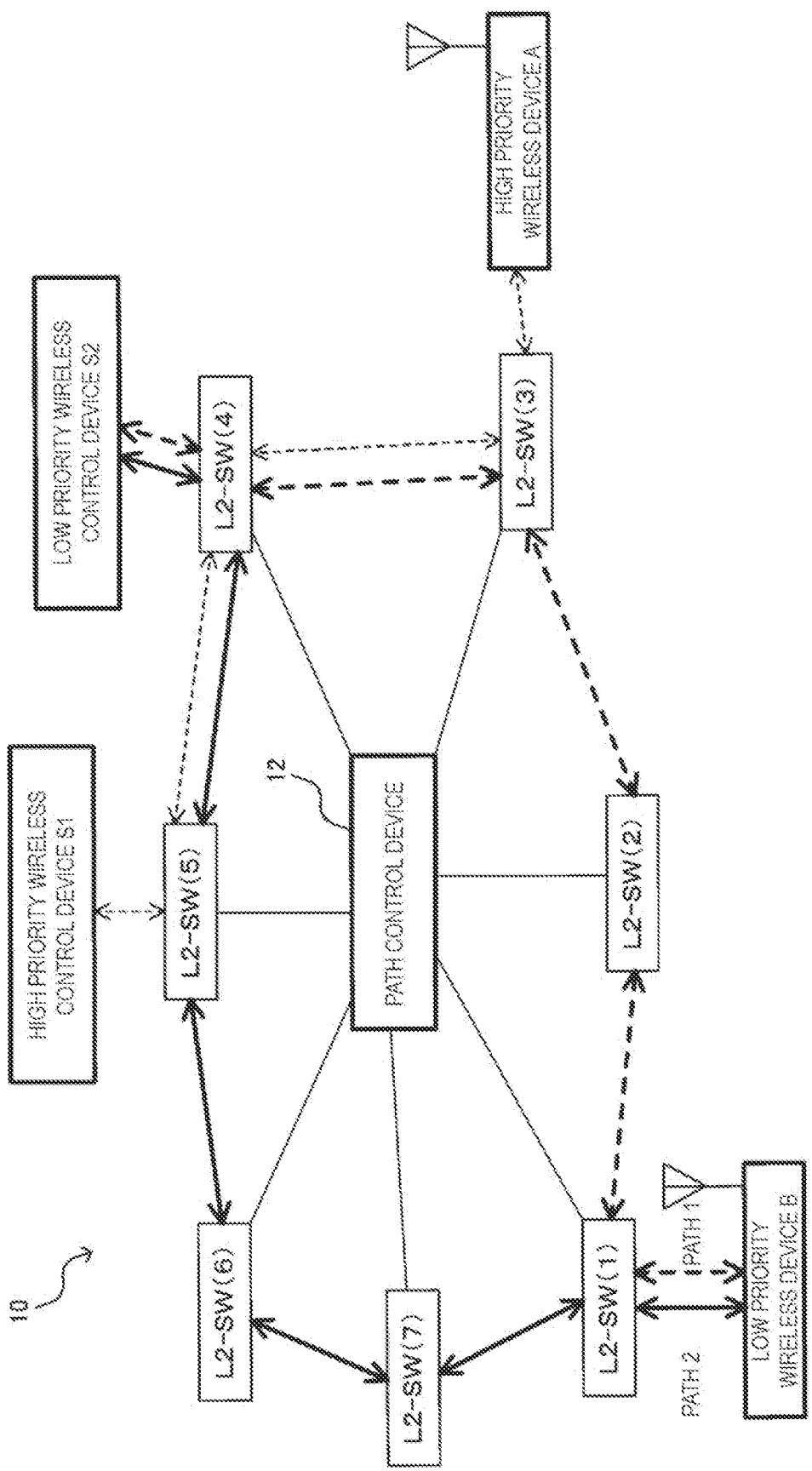
FIG. 3 is a diagram illustrating an example in which a communication path is set such that a path control device switches a path between a low priority wireless device and a low priority wireless control device.

FIG. 3 illustrates an example in which a communication path is set such that the path control device 12 switches a path between a low priority wireless device and a low priority wireless control device in the wireless communication network 10.

As illustrated in FIG. 3, for example, it is assumed that a communication path A⇔SW3⇔SW4⇔SW5⇔S1 is set between the high priority wireless device A and the high priority wireless control device S1. A path 1 (B⇔SW1⇔SW2⇔SW3⇔SW4⇔S2) and a path 2 (B⇔SW1⇔SW7⇔SW6⇔SW5⇔SW4⇔S2) are present between the low priority wireless device B and the low priority wireless control device S2.

That is, a path of SW3⇔SW4 and a path of SW5⇔SW4 are also used for communication between the high priority wireless device A and the high priority wireless control device S1 and communication between the low priority wireless device B and the low priority wireless control device S2. In this case, the path control device 12 switches between the path 1 and the path 2 on the basis of signal transmissible period information to select either the path 1 or the path 2 as a communication path between the low priority wireless device B and the low priority wireless control device S2.

Figure 4:
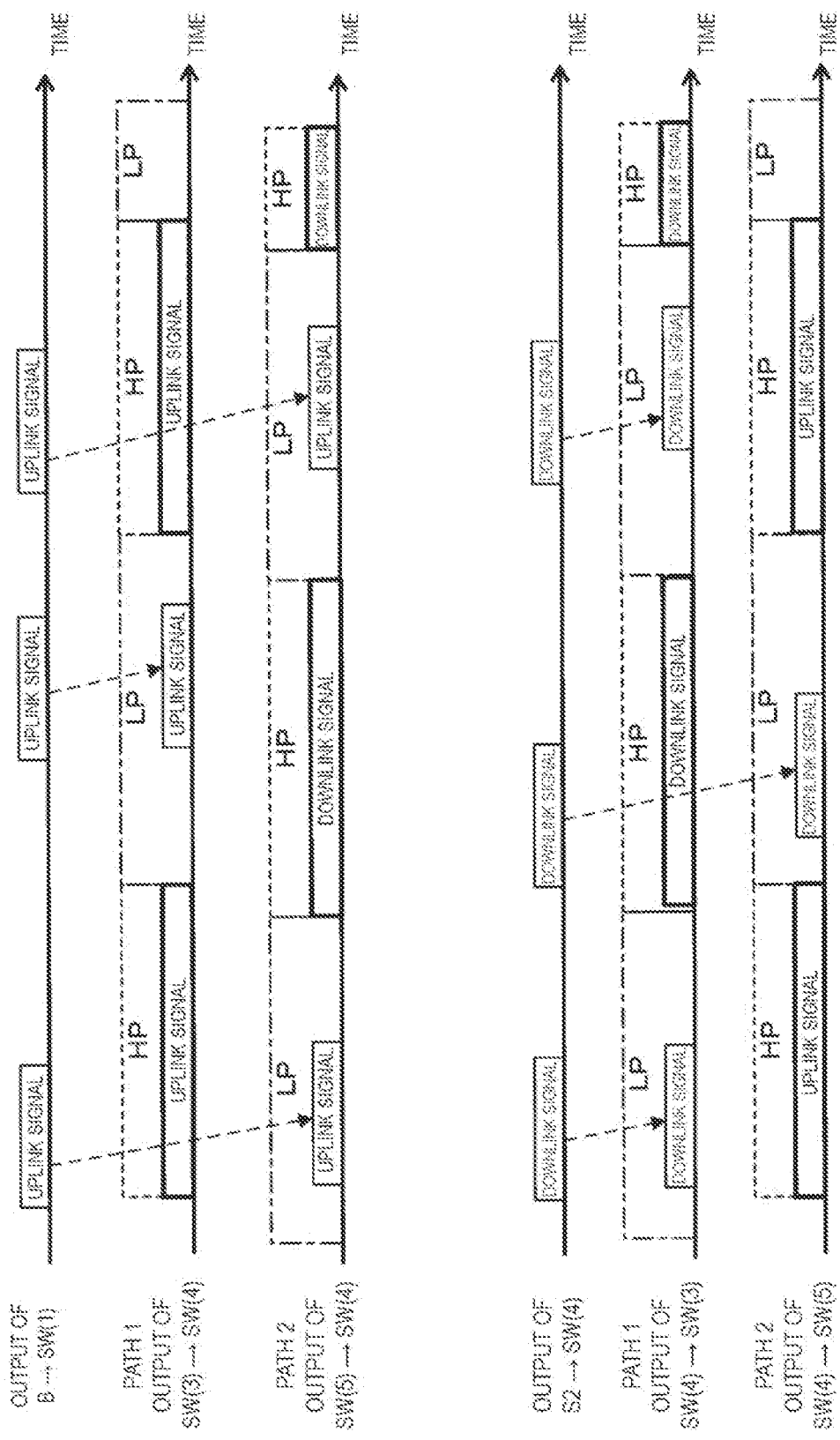
FIG. 4 is a diagram illustrating a flow of traffic of a communication path switched by a path control device.

FIG. 4 illustrates a flow of traffic of a communication path switched by the path control device 12 in the example illustrated in FIG. 3. As described above, the path control device 12 switches and sets a path between the low priority wireless device B and the low priority wireless control device S2 so that a period in which low priority traffic is transmitted is included within a low priority signal transmissible period (LP) of any one path between the low priority wireless device B and the low priority wireless control device S2.

That is, as illustrated in FIG. 4, an uplink signal output from the low priority wireless device B to SW1 is transmitted through a path 2 in which a period between SW5 and SW4 is a low priority signal transmissible period (LP) in a case where a period between SW3 and SW4 of a path 1 is a high priority signal transmissible period (HP).

In addition, an uplink signal output from the low priority wireless device B to SW1 is transmitted through a path 1 in which a period between SW3 and SW4 is a low priority signal transmissible period (LP) in a case where a period between SW5 and SW4 of a path 2 is a high priority signal transmissible period (HP).

In addition, a downlink signal output from the low priority wireless control device S2 to SW4 is transmitted through a path 1 in which a period between SW4 and SW3 is a low priority signal transmissible period (LP) in a case where a period between SW4 and SW5 of a path 2 is a high priority signal transmissible period (HP).

Further, a downlink signal output from the low priority wireless control device S2 to SW4 is transmitted through a path 2 in which a period between SW4 and SW5 is a low priority signal transmissible period (LP) in a case where a period between SW4 and SW3 of a path 1 is a high priority signal transmissible period (HP).

That is, in uplink communication, a path in which a low priority signal transmissible period is available is used, and thus a signal is transferred without a waiting time. Similarly, also in downlink communication, a path in which a low priority signal transmissible period is available is used, and thus a signal is transferred without a waiting time.

Note that signal transmissible period information in each SW is not necessarily acquired from each SW, and for example, a configuration in which the signal transmissible period information is set for the path control device 12 by a user may be adopted. In addition, the path control device 12 may change (control) a path between SWs to change a path of the low priority wireless device B and the low priority wireless control device S2, or may change (control) connection destinations SW of the low priority wireless device B and the low priority wireless control device S2.

Figure 5:
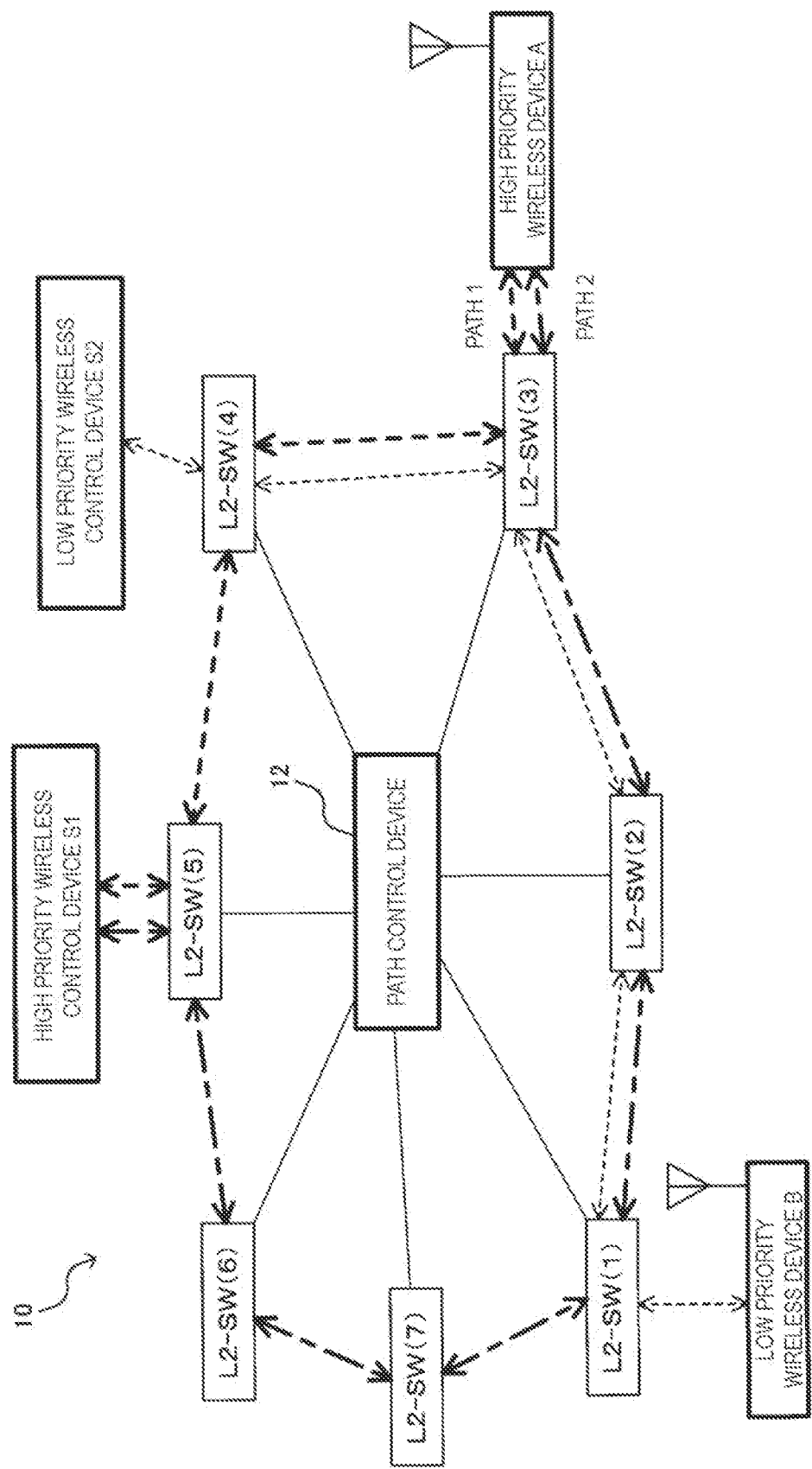
FIG. 5 is a diagram illustrating an example in which a communication path is set such that a path control device switches a path between a high priority wireless device and a high priority wireless control device.

FIG. 5 illustrates an example in which a communication path is set such that the path control device 12 switches a path between a high priority wireless device and a high priority wireless control device in the wireless communication network 10.

As described above, in the path control device 12, the communication path calculation unit 122 may calculate a low priority signal transmissible period in each path between the high priority wireless device A and the high priority wireless control device S1. In this case, the communication path setting unit 124 sets a path between the high priority wireless device A and the high priority wireless control device S1 so that a period in which low priority traffic is transmitted is included within a low priority signal transmissible period of any one path between the high priority wireless device A and the high priority wireless control device S1.

As illustrated in FIG. 5, for example, a communication path of B⇔SW1⇔SW2⇔SW3⇔SW4⇔S2 is set between the low priority wireless device B and the low priority wireless control device S2. A path 1 (A⇔SW3⇔SW4⇔SW5⇔S1) and a path 2 (A⇔SW3⇔SW2⇔SW1⇔SW7⇔SW6⇔SW5⇔S1) are present between the high priority wireless device A and the high priority wireless control device S1.

That is, in the path 1, a path of SW3⇔SW4 is also used for communication between the high priority wireless device A and the high priority wireless control device S1 and communication between the low priority wireless device B and the low priority wireless control device S2. In addition, in the path 2, a path of SW3⇔SW2 and a path of SW2⇔SW1 are also used for communication between the high priority wireless device A and the high priority wireless control device S1 and communication between the low priority wireless device B and the low priority wireless control device S2. In this case, the path control device 12 switches between the path 1 and the path 2 on the basis of signal transmissible period information to select either the path 1 or the path 2 as a communication path between the high priority wireless device A and the high priority wireless control device S1.

In general, when any flow (a pair of any transmission address and any destination addresses) is transmitted through two or more paths, the order reversal of frames may occur at the terminus (reception side) of a path. The frame is, for example, an Ethernet frame, or the like. In the embodiment described above, any one path is selected depending on a time slot, and only one path is used in a certain time slot, thereby suppressing the occurrence of order reversal of frames. However, in a case where a delay difference is large in each of the paths, it is considered that order reversal occurs when switching from a path having a long path length to a path having a short path length occurs. Hereinafter, an embodiment taking a delay difference of a path into consideration will be described.

Figure 6:
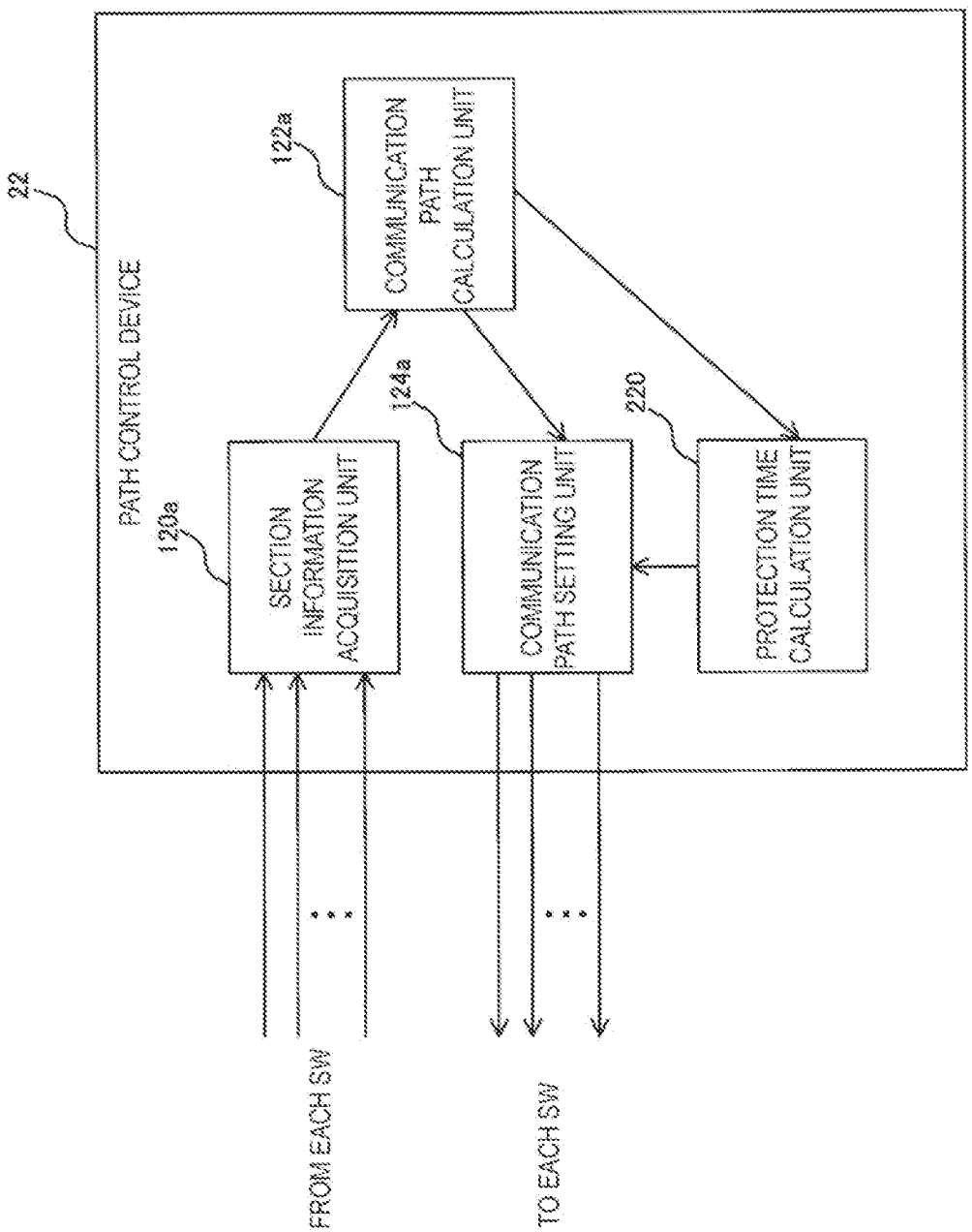
FIG. 6 is a diagram illustrating functions of a modification example of a path control device.

FIG. 6 illustrates functions of a modification example of the path control device 12 (a path control device 22). As illustrated in FIG. 6, the path control device 22 includes a section information acquisition unit 120a, a communication path calculation unit 122a, a protection time calculation unit 220, and a communication path setting unit 124a, and controls a communication path in the wireless communication network 10 described above.

The section information acquisition unit 120a acquires signal transmissible period information (communicable section information) including a high priority signal transmissible period (HP) and a low priority signal transmissible period (LP) in an SW from the respective SWs, and outputs the acquired signal transmissible period information to the communication path calculation unit 122a.

The communication path calculation unit 122a calculates a path through which low priority traffic in each time slot can be transmitted, on the basis of the signal transmissible period information input from the section information acquisition unit 120a, and outputs the calculated path to the communication path setting unit 124a and the protection time calculation unit 220.

For example, the communication path calculation unit 122a calculates a low priority signal transmissible period in each of paths between the low priority wireless device B and the low priority wireless control device S2.

Note that the communication path calculation unit 122a may calculate a low priority signal transmissible period in each of paths between the high priority wireless device A and the high priority wireless control device S1.

The protection time calculation unit 220 obtains delay times of the respective paths calculated by the communication path calculation unit 122a to calculate a protection time to be provided in a case where the path is switched, and outputs the calculated protection time to the communication path setting unit 124a. The protection time corresponds to a difference in the delay time between the paths. For example, the protection time calculation unit 220 calculates delay times of the respective paths from positional information of each of the SWs, the number of low priority wireless devices accommodated in each of the SWs, the number of low priority wireless control devices, and the like.

Further, in a case where delay times of the respective paths cannot be accurately calculated, the protection time calculation unit 220 may set a value obtained by adding a margin as a protection time.

The communication path setting unit 124a stops the transmission and output of SWs for the protection time calculated by the protection time calculation unit 220, and performs setting on each of the SWs so that a path between the low priority wireless device and the low priority wireless control device is switched to a path including a low priority signal transmissible period calculated by the communication path calculation unit 122 after the protection time elapses. Here, the communication path setting unit 124a includes a timing at which the path is switched in a timing at which the high priority wireless device A and the high priority wireless control device S1 change a transmission direction of a signal by TDD (a change timing between an uplink and a downlink).

An operation of stopping the transmission and output of SWs for the protection time is an operation which is the same as an operation of closing a gate so that new low priority traffic does not flow within a high priority signal transmissible period. The communication path setting unit 124a cancels the stopping of transmission and output after the protection time elapses, but may subtract a time required for start-up from the protection time in a case where it takes time to perform start-up after the stopping of the output is canceled.

For example, the communication path setting unit 124a stops the transmission and output of SWs for the protection time calculated by the protection time calculation unit 220, and sets a path between the low priority wireless device B and the low priority wireless control device S2 so that a period in which low priority traffic is transmitted is included in a low priority signal transmissible period of any one path between the low priority wireless device B and the low priority wireless control device S2 which is calculated by the communication path calculation unit 122a after the protection time elapses.

Note that the communication path setting unit 124a may stop the transmission and output of SWs for the protection time calculated by the protection time calculation unit 220, and may set a path between the high priority wireless device A and the high priority wireless control device S1 so that a period in which low priority traffic is transmitted is included in a low priority signal transmissible period of any one path between the high priority wireless device A and the high priority wireless control device S1 which is calculated by the communication path calculation unit 122a after the protection time elapses.

Figure 7:
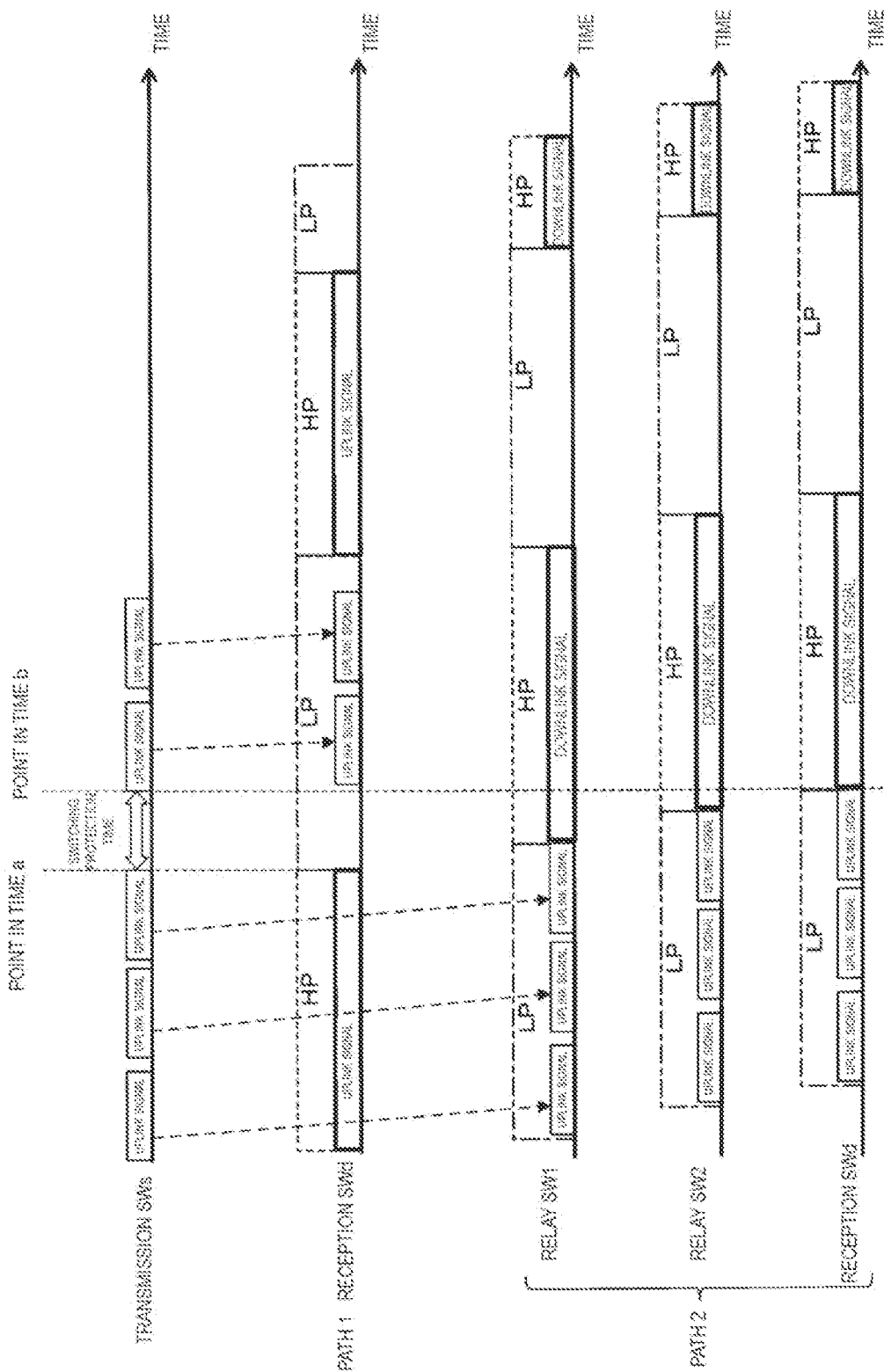
FIG. 7 is a diagram illustrating a flow of traffic of a communication path switched by a path control device.
Figure 8:
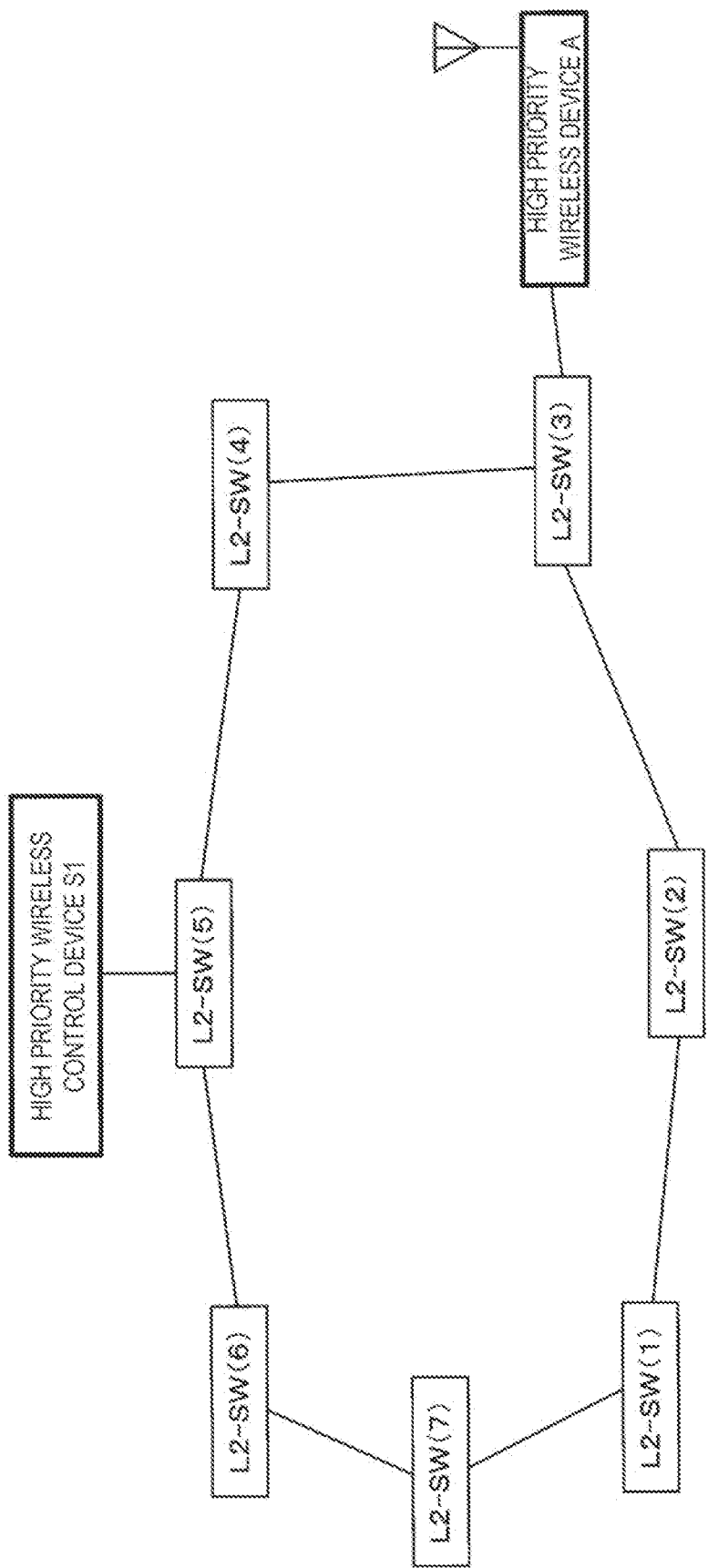
FIG. 8 is a diagram illustrating an example in which one high priority wireless device and one high priority wireless control device are accommodated in an L2NW.
Figure 9:
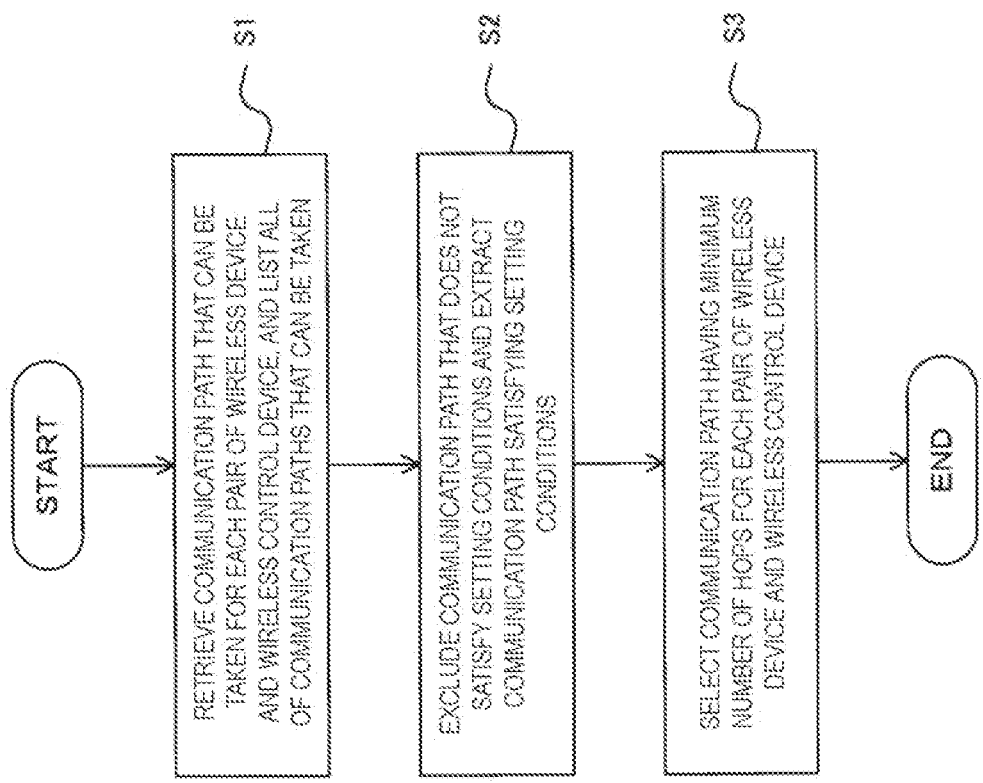
FIG. 9 is a diagram illustrating a path selection procedure of the related art.
Figure 10:
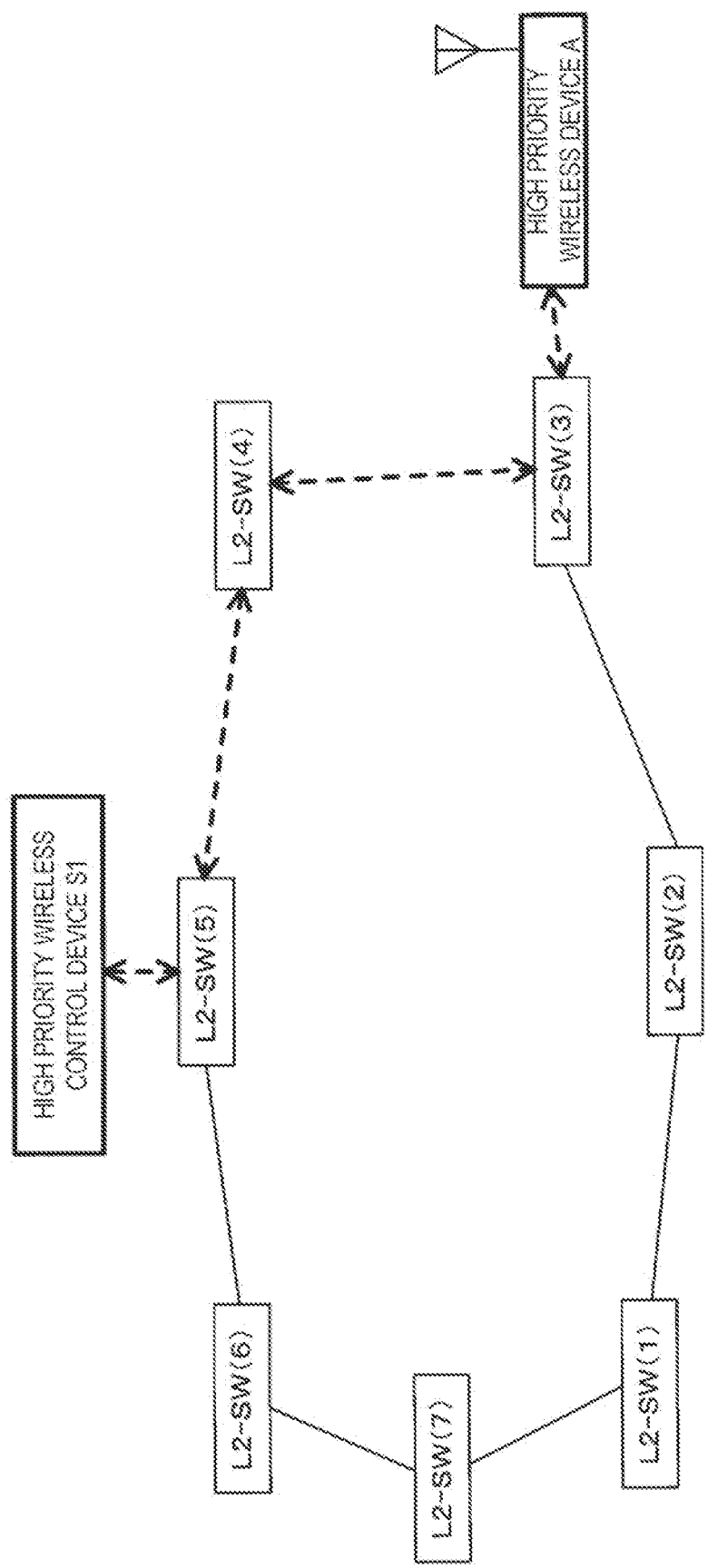
FIG. 10 is a diagram illustrating an example of a case where a communication path is selected according to the related art.
Figure 11:
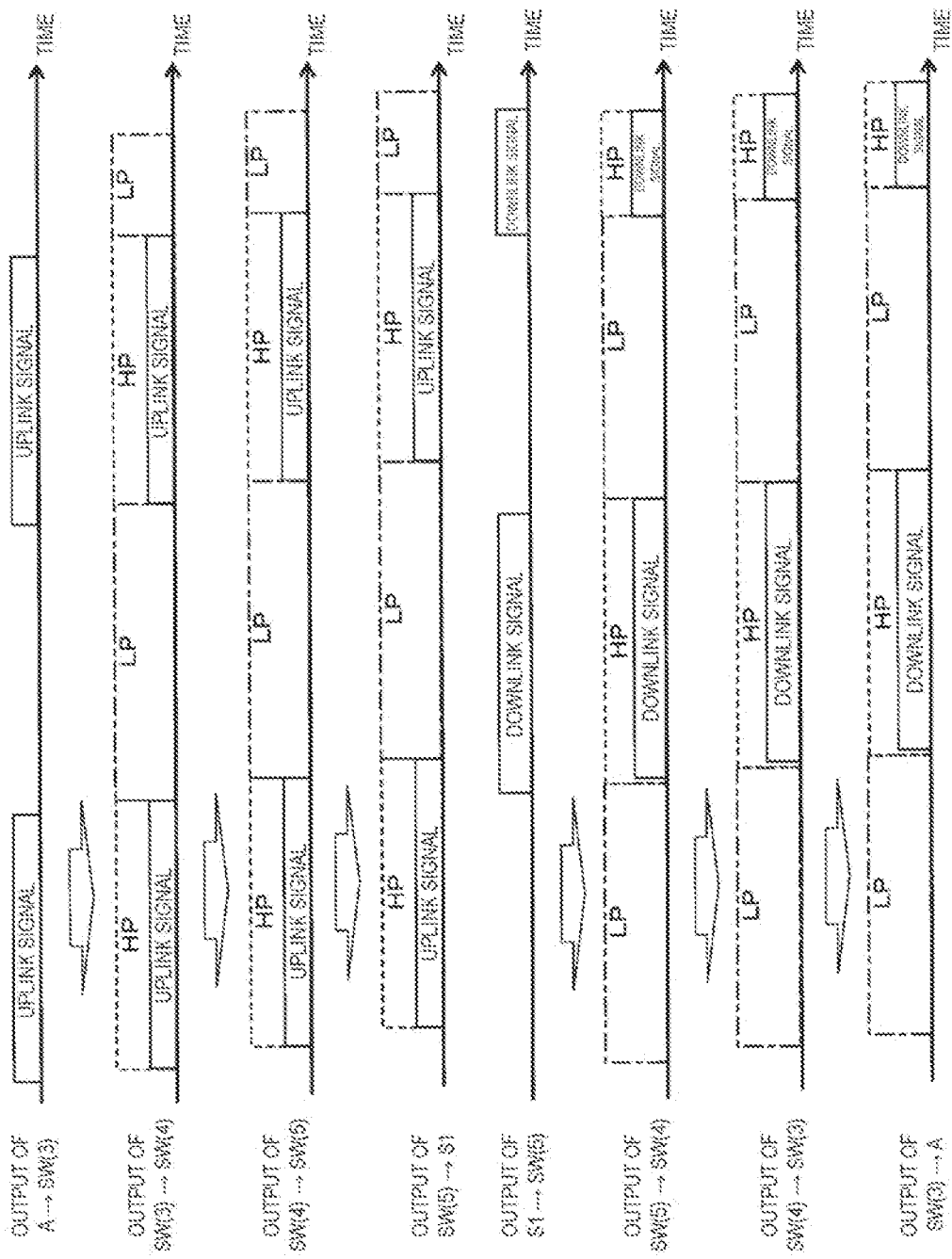
FIG. 11 is a diagram illustrating a flow of traffic in the example illustrated in FIG. 10.
Figure 12:
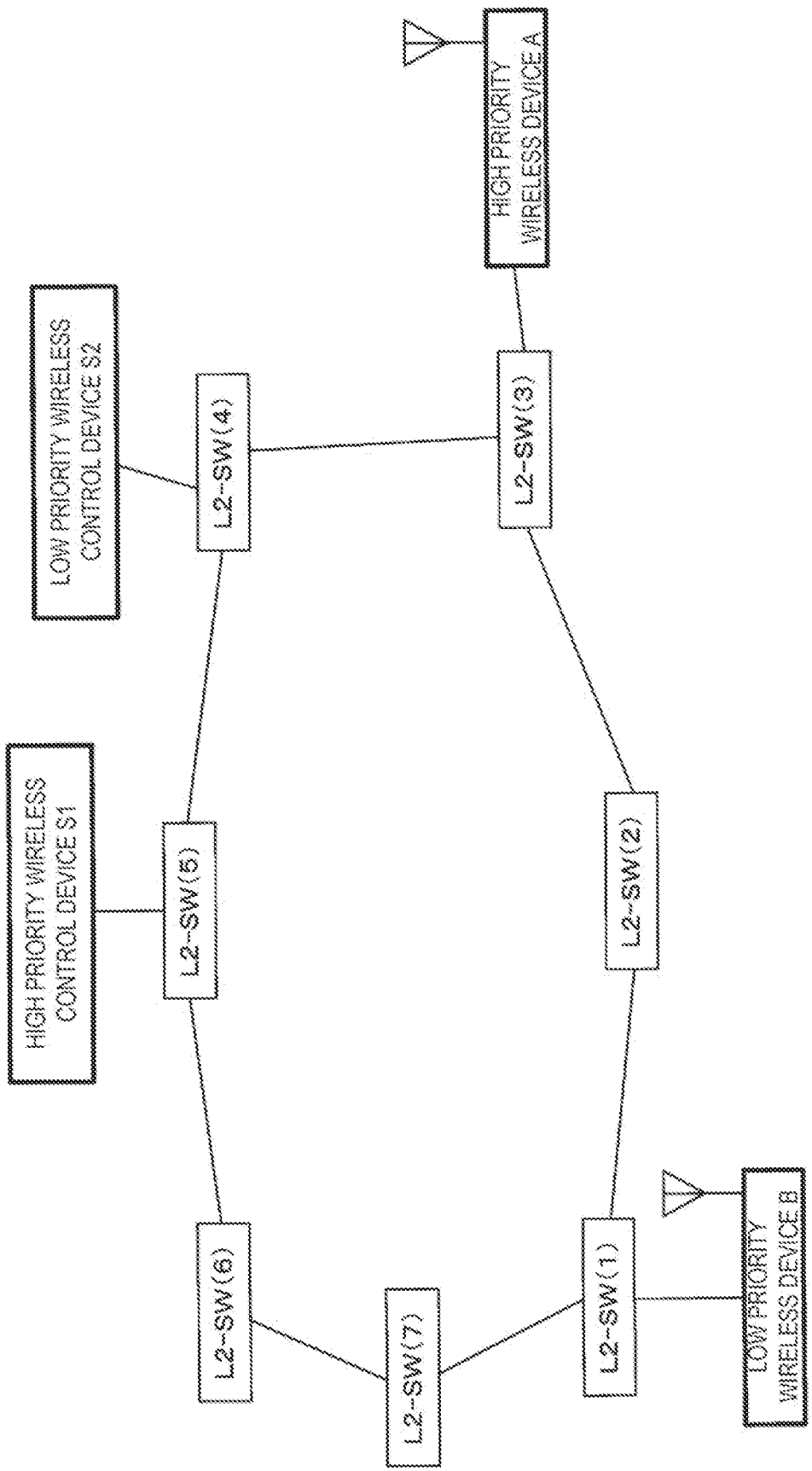
FIG. 12 is a diagram illustrating an example in which a high priority wireless device, a high priority wireless control device, a low priority wireless device, and a low priority wireless control device are accommodated in an L2NW.
Figure 13:
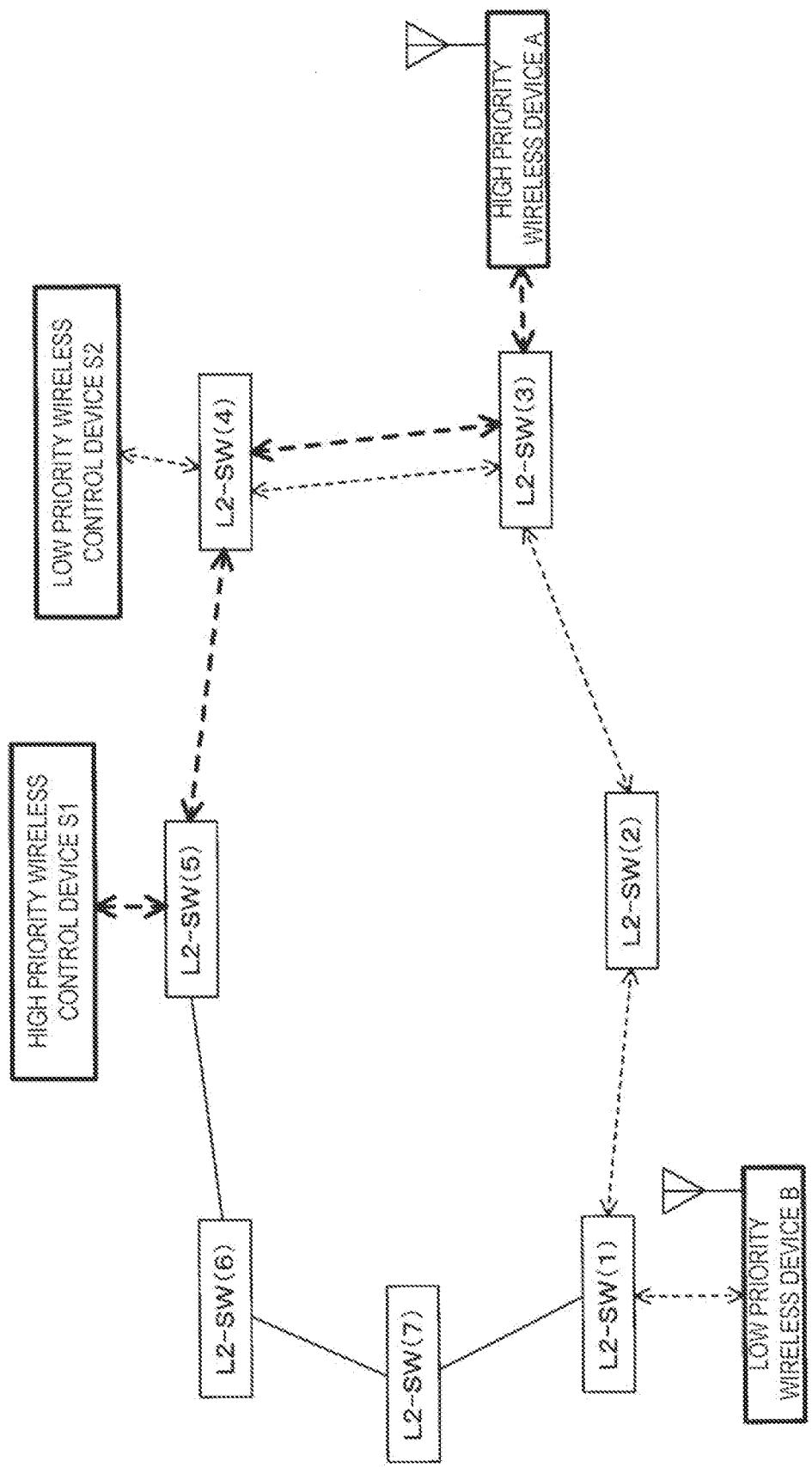
FIG. 13 is a diagram illustrating the selection of a communication path to which a path selection procedure of the related art is applied.
Figure 14:
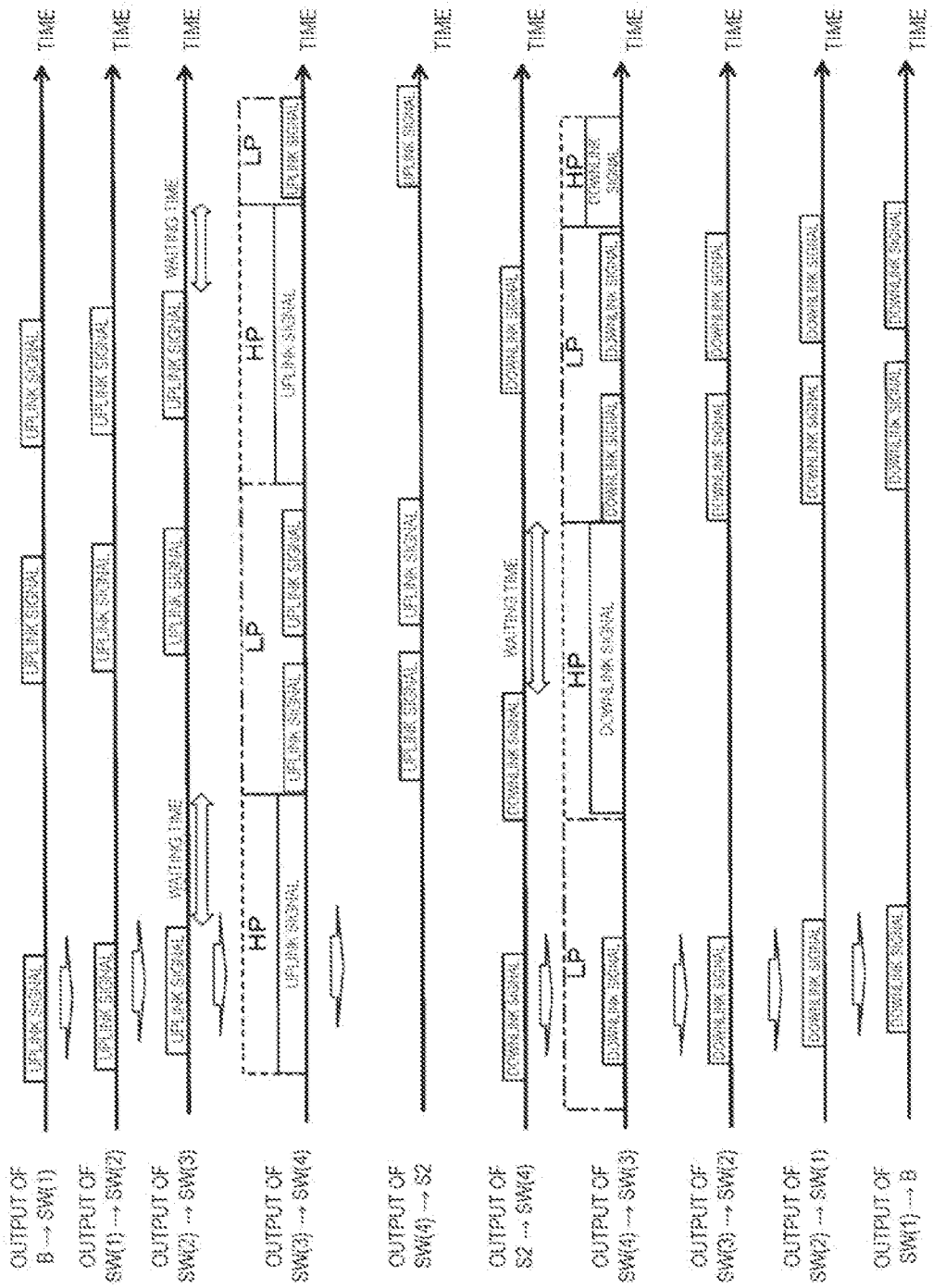
FIG. 14 is a diagram illustrating a flow of traffic in the example illustrated in FIG. 13.

FIG. 7 illustrates a flow of traffic of a communication path switched by the path control device 22. The path control device 22 switches and sets a path between a low priority wireless device and a low priority wireless control device, for example, so that a period in which low priority traffic is transmitted is included in a low priority signal transmissible period (LP) of any one path between the low priority wireless device and the low priority wireless control device. Here, it is assumed that a path 1 between a transmission SWs and a reception SWd and a path 2 between the transmission SWs, a relay SW1, a relay SW2, and the reception SWd are present, and the path 2 has a longer path length and a longer delay time than those of the path 1.

As illustrated in FIG. 7, for example, in a case where the path 1 is a high priority signal transmissible period (HP), an uplink signal output from the transmission SWs is transmitted through the path 2 which is a low priority signal transmissible period (LP).

In a case where the path 2 is a high priority signal transmissible period (HP), an uplink signal output from the transmission SWs is transmitted through the path 1 which is a low priority signal transmissible period (LP).

If a path is switched from the path 2 to the path 1 at a point in time "a" and a new frame is transmitted immediately, there is a possibility that a new frame passing through the path 1 will reach the reception SWd before a frame passing through the path 2 reaches the reception SWd. That is, order reversal of frames may occur.

Thus, the path control device 22 causes the communication path setting unit 124a to stop the transmission and output of the transmission SWs for the protection time and cancels the stopping of the transmission and output of the transmission SWs at a point in time "b" after the protection time elapses. Thereby, after all of the frames passing through the path 2 reach the reception SWd, a new frame passing through the path 1 reaches the reception SWd, and thus order reversal is prevented.

If the protection time is not sufficiently long, order reversal of frames occurs, and thus an error occurs in the low priority wireless device or the low priority wireless control device. In this case, the path control device 22 may be configured such that the protection time calculation unit 220 adjusts the protection time on the basis of information of the error.

In this manner, the path control device 12 or the path control device 22 sets switching for each of the L2-SW(1) to the L2-SW(7) so that a period in which low priority traffic is transmitted is included in a low priority signal transmissible period, and thus it is possible to reduce a waiting time of low priority traffic. In addition, an operator may perform setting for each of the L2-SW(1) to the L2-SW(7) at the actual location so that traffic flows to a communication path to be switched.

Note that the functions of the path control device 12 or the path control device 22 may be mounted at any one of the units constituting the wireless communication network 10 or may be mounted to be distributed to the units constituting the wireless communication network 10.

Further, in the above-described embodiment, an example in which the path control device 12 and the path control device 22 are used in a ring-type network has been described, but the present disclosure is not limited to a ring-type network configuration, for example, may be used in other networks, such as a honeycomb type or a mesh type in which there are two or more paths between a low priority wireless device and a low priority wireless control device.

In addition, description has been given so far on the assumption that a low priority signal transmissible period is necessarily included in any one path. Regarding a time section in which a low priority signal transmissible period is not included in any path, it is not necessary to change a path, and thus a path selected before entering a time section in which the low priority signal transmissible period is not included may be left as it is.

Further, in a case where there are two or more paths in a low priority signal transmissible period at the same time, any path may be selected. For example, a path having a shortest hop may be selected as in the related art.

As described above, according to the path control device 12 or the path control device 22 of the embodiment, it is possible to reduce a waiting time of low priority traffic. Note that the functions of the path control device 12 or the path control device 22 may be implemented by dedicated hardware, or may be implemented as a program on general-purpose hardware having functions as a computer including a CPU.

That is, the functions of the path control device 12 or the path control device 22 according to the present disclosure can also be realized by a computer and a program, and the program can also be recorded in a recording medium and provided through a network.

REFERENCE SIGNS LIST

10 Wireless communication network
12, 22 Path control device
120, 120a Section information acquisition unit
122, 122a Communication path calculation unit
124, 124a Communication path setting unit
220 Protection time calculation unit

The invention claimed is:

1. A path control method of controlling a path of communication in a network including: a high priority device dealing with high priority traffic,
   a high priority control device communicating with the high priority device through a plurality of signal transfer devices transferring signals by periodically repeating a high priority signal transmissible period in which high priority traffic is transmissible and a low priority signal transmissible period in which low priority traffic is transmissible,
   a low priority device dealing with the low priority traffic, and
   a low priority control device communicating with the low priority device through the plurality of signal transfer devices, the path control method comprising:
   calculating a low priority signal transmissible period in each of paths between the low priority device and the low priority control device; and
   performing setting for switching the path between the low priority device and the low priority control device so that the low priority traffic is transmitted in any one of the calculated low priority signal transmissible periods.

2. The path control method according to claim 1, wherein the performing setting includes matching a timing at which the path is switched to a timing at which the high priority device and the high priority control device change a transmission direction of a signal by TDD.

3. The path control method according to claim 1, further comprising:
   obtaining a delay time of each of the paths calculated in the calculating and calculating a protection time corresponding to a difference in the delay time between the paths,
   wherein the performing setting includes performing setting for switching the path so that new low priority traffic does not flow until the protection time elapses.

4. A path control method of controlling a path of communication in a network including: a high priority device dealing with high priority traffic,
   a high priority control device communicating with the high priority device through a plurality of signal transfer devices transferring signals by periodically repeating a high priority signal transmissible period in which high priority traffic is transmissible and a low priority signal transmissible period in which low priority traffic is transmissible,
   a low priority device dealing with the low priority traffic, and
   a low priority control device communicating with the low priority device through the plurality of signal transfer devices, the path control method comprising:
   calculating a low priority signal transmissible period in each of paths between the high priority device and the high priority control device; and
   performing setting for switching the path between the high priority device and the high priority control device so that the low priority traffic is transmitted in any one of the calculated low priority signal transmissible periods.

5. A path control device that controls a path of communication in a network including: a high priority device dealing with high priority traffic,
  a high priority control device communicating with the high priority device through a plurality of signal transfer devices transferring signals by periodically repeating a high priority signal transmissible period in which high priority traffic is transmissible and a low priority signal transmissible period in which low priority traffic is transmissible,
  a low priority device dealing with the low priority traffic, and
  a low priority control device communicating with the low priority device through the plurality of signal transfer devices, the path control device comprising:
  a communication path calculation unit configured to calculate a low priority signal transmissible period in each of paths between the low priority device and the low priority control device; and
  a communication path setting unit configured to perform setting for switching the path between the low priority device and the low priority control device so that the low priority traffic is transmitted in any one of the calculated low priority signal transmissible periods.

6. The path control device according to claim 5, wherein the communication path setting unit matches a timing at which the path is switched to a timing at which the high priority device and the high priority control device change a transmission direction of a signal by TDD.

7. The path control device according to claim 5, further comprising:
  a protection time calculation unit configured to obtain a delay time of each of the paths calculated in the communication path calculation unit and calculate a protection time corresponding to a difference in the delay time between the paths,
  wherein the communication path setting unit performs setting for switching the path so that new low priority traffic does not flow until the protection time elapses.

* * * * *